US012760556B2

(12) United States Patent
Di Sario et al.

(10) Patent No.: US 12,760,556 B2
(45) Date of Patent: Oct. 13, 2026

(54) LOCKING DEVICE WITH A STATOR, A ROTOR, AND AN ANTI-PULL-OUT DEVICE

(71) Applicant: DORMAKABA SCHWEIZ AG, Wetzikon (CH)

(72) Inventors: Franco Di Sario, Wetzikon (CH); Markus Zahner, Wetzikon (CH)

(73) Assignee: DORMAKABA SCHWEIZ AG, Wetzikon (CH)

(*) Notice: Subject to any disclaimer, the term of this patent is extended or adjusted under 35 U.S.C. 154(b) by 129 days.

(21) Appl. No.: 18/714,969

(22) PCT Filed: Dec. 2, 2022

(86) PCT No.: PCT/EP2022/084203
§ 371 (c)(1),
(2) Date: May 30, 2024

(87) PCT Pub. No.: WO2023/099729
PCT Pub. Date: Jun. 8, 2023

(65) Prior Publication Data

US 2024/0392603 A1 Nov. 28, 2024

(30) Foreign Application Priority Data

Dec. 3, 2021 (EP) .................................... 21212267

(51) Int. Cl.
*E05B 11/00* (2006.01)
*E05B 17/18* (2006.01)
*E05B 47/06* (2006.01)

(52) U.S. Cl.
CPC .......... *E05B 11/005* (2013.01); *E05B 17/185* (2013.01); *E05B 47/0611* (2013.01)

(58) Field of Classification Search
CPC ...... E05B 11/00; E05B 11/005; E05B 17/185; E05B 47/0611; Y10T 70/7768
(Continued)

(56) References Cited

U.S. PATENT DOCUMENTS 1,622,732 A * 3/1927 Nelson .................... B60R 25/04 70/215
2,874,563 A * 2/1959 Schlage ................ E05B 17/186 70/455
(Continued)

FOREIGN PATENT DOCUMENTS

DE 60215405 T2 * 8/2007 ......... E05B 27/0042
DE 102024108787 B3 * 5/2025 .............. E05B 11/00
(Continued)

OTHER PUBLICATIONS

International Search Report for Application No. PCT/EP2022/084203, dated Feb. 13, 2023, 2 pages.
(Continued)

*Primary Examiner* — Suzanne L Barrett
(74) *Attorney, Agent, or Firm* — CANTOR COLBURN LLP

(57) ABSTRACT

A locking device includes a stator,
with a rotor,
and
with an anti-pull-out device for preventing a key from being pulled out over a rotational angle range,
wherein the anti-pull-out device can be moved into a first position and into a second position,
wherein the anti-pull-out device has an elastic design, wherein the elastic effect forces the anti-pull-out device into the second position. The
anti-pull-out device has a bent annular region for operatively connecting to the key, wherein the bent annular region includes at least one gap in the first position for introducing a key,
wherein in the second position of the anti-pull-out device, the gap is modified such that the key is prevented from being inserted or from being pulled out.

15 Claims, 6 Drawing Sheets

(58) Field of Classification Search
USPC .............................................................. 70/266
See application file for complete search history.

(56) References Cited

U.S. PATENT DOCUMENTS

| | | | | |
|---|---|---|---|---|
| 4,300,374 | A * | 11/1981 | Mullich | E05B 27/00 70/389 |
| 8,474,290 | B2 * | 7/2013 | Terhaar | E05B 83/26 292/DIG. 43 |
| 2020/0248474 | A1 * | 8/2020 | Hernandez | E05B 27/083 |
| 2021/0388639 | A1 * | 12/2021 | E | E05B 67/24 |

FOREIGN PATENT DOCUMENTS

| | | | |
|---|---|---|---|
| EP | 2931995 | A1 | 10/2015 |
| EP | 3477023 | B1 | 4/2020 |
| FR | 30647 | E | 7/1926 |
| FR | 2922245 | A1 | 4/2009 |
| FR | 3050222 | A1 | 10/2017 |
| WO | 2014090209 | A1 | 6/2014 |

OTHER PUBLICATIONS

Written Opinion for Application No. PCT/EP2022/084203, dated Feb. 13, 2023, 3 pages.

* cited by examiner

LOCKING DEVICE WITH A STATOR, A ROTOR, AND AN ANTI-PULL-OUT DEVICE

CROSS-REFERENCE TO RELATED APPLICATIONS

This application is a 35 U.S.C. § 371 National Stage patent application of PCT/EP2022/084203, filed on 2 Dec. 2022, which claims the benefit of European patent application 21212267.5, filed on 3 Dec. 2021, the disclosures of which are incorporated herein by reference in their entirety.

TECHNICAL FIELD

The disclosure relates to a locking device with a stator, with a rotor and with an anti-pull-out device for preventing a key from being withdrawn over a rotation angle range, wherein the anti-pull-out device is movable into a first position and into a second position, wherein the anti-pull-out device is designed to be elastic, wherein the elastic effect forces the anti-pull-out device into the second position. Furthermore, the disclosure relates to a closing device equipped with a locking device according to claim 14. Closing devices are available in numerous designs, for example in the form of a locking cylinder for doors, gates or windows. The disclosure also relates to a closing system with a locking device according to the disclosure and/or a closing device according to the disclosure and with a corresponding key.

BACKGROUND

EP 3477023 B1 discloses a closing cylinder as a locking device, which comprises an anti-pull-out device for a key. The anti-pull-out device comprises three balls that are arranged at different angular distances from each other and can grip into corresponding recesses in the key. The anti-pull-out device further comprises a spring device that forces the balls from a first position into a second position. The balls are disengaged from the key in the first position and engaged with the key in the second position. In a rotational position of the key, recesses are provided in the stator such that in this rotational position of the key the balls can move into the recesses in the stator against the force of the spring device and thus into the first position and the key can be withdrawn in this rotational position. A spring pushes the key out of the keyway. The disadvantage here is the space-consuming shape of the anti-pull-out device and the difficult installation.

SUMMARY

The disclosure therefore provides a generic locking device with a simple and/or space-saving anti-pull-out device for the key. The anti-pull-out device should be as simple and/or space-saving as possible and/or easy to install.

This is achieved by providing the independent claim. Advantageous further developments of the device are indicated in the dependent device claims, the description and in the figures. Furthermore, this is also achieved by providing a closing device and by a closing system according to the claims. Advantageous further developments of the closing device and the closing system are indicated in the description and in the figures. Features and details that are described in connection with the locking device according to the disclosure also apply in connection with the closing device according to the disclosure and/or the closing system and vice versa. In this case, the features mentioned in the description and in the claims may each be essential to the disclosure individually by themselves or in combination. With the locking device according to the disclosure, a locking effect, for example of a door, a gate or a window or the like, can preferably be achieved.

According to the disclosure, the anti-pull-out device comprises an annular bent region for operative connection with the key. In the first position, the annular bent region comprises at least one gap for inserting a key, wherein in the second position of the anti-pull-out device the gap is changed such that insertion or withdrawal of the key is inhibited.

This creates a simple and space-saving anti-pull-out device that can be easily mounted on the stator of the locking device. The annular bent region preferably encloses the keyway. Due to its annular shape, the anti-pull-out device is particularly small. The elastic effect of the anti-pull-out element can also be referred to as an elastic force.

The anti-pull-out device is preferably arranged stationary on the stator. In other words, the anti-pull-out device does not move with the movement of the rotor.

The key rotates with the rotor of the locking device. The key assumes different rotational positions in relation to the stator and thus in relation to the anti-pull-out device. The key can be withdrawn in at least one rotation position, which corresponds to at least one start position. In other rotational positions, which are designed as locking positions, however, the key's anti-pull-out device prevents it from being withdrawn. For example, exactly one start position can be provided.

Withdrawal of the key is prevented in the locking positions in which the anti-pull-out device and the key are in operative connection, in particular in engagement, with each other. The annular bent region of the anti-pull-out device serves this purpose. In at least one start position, however, the engagement of the key with the anti-pull-out device is or can be released. This results in a bayonet-like interaction between the anti-pull-out device and the key. In particular, the key can migrate behind the anti-pull-out device during rotation, such that the key cannot be withdrawn.

The gap is preferably adapted to the width of the key and can open easily when the key is inserted and/or withdrawn. The opening of the gap when the key is withdrawn can preferably only be carried out when the key is in at least one start position. The opening of the gap upon insertion of the key can preferably only be carried out when the key is oriented with respect to the locking device as in the at least one start position.

Preferably, the locking device comprises a keyway for inserting a key. Preferably, the anti-pull-out device is arranged with the annular bent region around the keyway.

The locking device is preferably designed as an electromechanical locking device. For this purpose, the locking device comprises an electromechanical actuator. The actuator can in particular be designed as an electric motor.

The actuator is used in particular to enable a driver to be moved when a user is electronically authorized.

It is preferably provided that the gap in the second position is formed with a smaller width than in the first position. Thus, the change of the gap from the first position to the second position means that the width of the gap has decreased. The width is understood to be a spatial direction perpendicular to a axis of rotation of the rotor.

It can further be provided that in the second position the gap is reduced such that the width of the gap is smaller than the width of the key. In the second position of the anti-pull-out device, the key cannot be withdrawn. Rather, the anti-pull-out device must first move against the spring effect into the first position such that the key can be withdrawn.

In the first position, the width of the gap is preferably greater than or equal to the width of the key. Preferably, in the first position, the anti-pull-out device rests against the key against the spring action, such that the width of the gap corresponds to the width of the key.

It can be provided that the anti-pull-out device is formed with a first end and a second end. Preferably, the annular bent region comprises the first and the second end.

The anti-pull-out device is preferably designed such that the first end and the second end are moved, in particular rotated, against each other during a transition from the first position to the second position, such that the width of the gap is smaller in the second position than in the first position. The transition from the first position into the second position is achieved by the elastic effect of the anti-pull-out device.

The anti-pull-out device is preferably designed such that the first end and the second end are moved, in particular rotated, against each other during a transition from the second position into the first position such that the width of the gap is larger in the first position than in the second position. The transition from the second position into the first position occurs against the spring force of the anti-pull-out device, i.e. the anti-pull-out device is mechanically tensioned.

The annular bent region may comprise at least a first and a second partial region. It can be provided that the first partial region and the second partial region are forced towards each other by the elastic effect. It can be provided that the elastic effect forces the first partial region in a first direction and the second partial region in a second, opposite direction.

The annular bent region may comprise at least one stop with which a position of the annular bent region in the second position against the elastic effect is defined. The stop preferably fixes the position of the annular bent region against the elastic effect in the second position.

Preferably, at least a first and a second stop are provided. In particular, the first stop limits the movement of the first partial region in the first direction and the second stop limits the movement of the second partial region in the second direction.

Preferably, the first end and the second end abut against each other in the second position. For example, the width of the gap in the second position can be defined by the abutment of the first and second ends. Thus, the first end and the second end serve as the first and second stops. The second end serves as a counter stop for the first end and the first end serves as a counter stop for the second end.

Alternatively, the first and/or second stop may be spaced apart from the first and second ends, respectively. In particular, the stator can serve as a counter stop for the first and/or the second stop, such that the first and/or the second stop rests against the stator in the second position of the anti-pull-out device.

The first and second ends are preferably arranged at the gap.

It may be provided that the first end and the second end are spaced apart from each other in the first position. This can increase the width of the gap.

The first partial region may comprise the first end. The second partial region may comprise the second end.

In particular, it is provided that the anti-pull-out device comprises a spring device. The spring device can be designed to force the remaining anti-pull-out device into the second position. The spring device can be designed to force the annular bent region into the second position. The spring device is particularly responsible for the elastic effect according to the disclosure. Thus, the spring device is particularly responsible for the fact that the gap is changed in the second position, in particular is provided with a smaller width. Because a spring device is provided, the anti-pull-out device can be designed in several parts. Alternatively, the annular bent region itself can be designed with pretensioning.

It is possible that the first and second partial region are connected in one piece. Preferably, the first and second partial regions are connected to one another in a hinge-like manner. For this purpose, a flexible transition zone can be provided between the first and the second partial region.

The anti-pull-out device preferably has at least a first protective element part and a second protective element part, wherein the first and the second protective element part are forced towards each other by the elastic effect, in particular by the spring device. The first and the second protective element part preferably serve to form the annular bent region. Thus, it is conceivable that the first partial region is designed as a first protective element part and the second partial region is designed as a second protective element part.

The first and second protective element parts are designed separately from each other. The first and second protective element parts preferably form individual parts. Because a first and a second protective element part are provided as individual parts, the anti-pull-out device can be designed in several parts.

The protective element parts cannot be directly connected to each other. For example, the protective element parts can be connected to each other via the spring device.

Alternatively, the first and the second protective part element can be directly movably connected to one another, in particular can be movably connected to one another in a hinge-like manner.

The first protective element part may comprise the first end. The second protective element part may comprise the second end.

In the first position, the protective element parts are preferably pushed away from each other. When inserting and/or withdrawing the key, it tends to push the protective element parts away from each other. Preferably, the ends of the first and second protective element parts are spaced apart from each other in the first position.

Preferably, the first partial region and the second partial region, in particular the first and the second protective element parts, together form the gap. In other words, the first end and the second end both end at the gap.

The first and second ends may be closer together in the second position than in the first position.

For example, the first and second protective element parts are semicircular.

The anti-pull-out device can have a first sliding surface in order to be moved into the first position when the key is inserted against the elastic force, in particular against the force of the spring device. This widens the gap so that the key can be inserted. Additionally or alternatively, the anti-pull-out device has a second sliding surface in order to be moved into the first position when the key is withdrawn against the spring force, in particular against the force of the spring device. This widens the gap so that the key can be withdrawn.

The spring device is designed in particular as a leaf spring adapted to the contour of the remaining anti-pull-out device.

The spring device is designed in particular as a leaf spring that is adapted to the contour of the annular bent region. The spring device is designed in particular as a leaf spring adapted to the contour of the first and the second protective element part. Thus, it can be provided that the entire anti-pull-out device is formed in an annular bend.

The leaf spring is particularly advantageously seated on the outer surface of the annular bent region, in particular on the outer surface of the first and second protective element parts, and presses the annular bent region together, so that the spring device is designed like a clip. The spring device can be designed to press the first and the second protective element parts towards each other. In particular, the spring device compresses the gap in a certain way towards a smaller gap size. Due to its design as a leaf spring, the spring device is particularly space-saving. For example, the spring device can be curved, in particular in the form of an open ring.

The rotor may comprise a first rotor element.

The anti-pull-out device is preferably inserted in a groove of the rotor, in particular of a first rotor element of the rotor.

Due to the elastic effect, in particular due to the spring device, the anti-pull-out device can be clamped to the rotor and in particular to the first rotor element. This makes installation easy.

If the separate spring device is provided, the annular bent region, in particular the semicircular protective element parts, can be easily inserted into the groove first, and then the clip-like spring device is placed on the annular bent region, in particular on the protective element parts. The spring device then presses the annular bent region, in particular the protective element parts, into the groove and holds the annular bent region, in particular the protective element parts, in the groove in a captive manner and with slight radial movement.

It is further provided that the anti-pull-out device is non-rotatably secured in the stator during rotation of the key. During key rotation, the anti-pull-out device is preferably in the second position. For example, the key can be moved with one shoulder of the key behind the anti-pull-out device, which blocks the withdrawal of the key.

It is further provided that the anti-pull-out device is fixed in the stator in a rotationally fixed manner in the first position and in the second position. Here, "rotationally fixed" is to be understood in relation to the rotation of the rotor. On the other hand, the fastening of the anti-pull-out device with respect to the stator is subject to such a play that a movement of the anti-pull-out device between the first and the second position is possible. In this case, the anti-pull-out device and the stator can be connected in a form-fitting manner. For this purpose, the stator can comprise a first form-fitting means and the anti-pull-out device, in particular the annular bent region, can comprise a second form-fitting means. The first form-fitting means and the second form-fitting means can engage with each other with a clearance in order to enable movement from the first position to the second position. The second form-fitting means can serve as a stop and/or the first form-fitting means can serve as a counter stop.

Preferably, the stator comprises at least one cavity, in particular one that is open at the front, into which at least one projection of the anti-pull-out device, in particular of the annular bent region, can be inserted. The at least one cavity can thus serve as a first form-fitting means and the at least one projection can serve as a second form-fitting means. This makes installation easy. By arranging the projection in the cavity, the anti-pull-out device is arranged in a rotationally fixed manner in the stator. Here, "rotationally fixed" is to be understood in relation to the rotation of the rotor. In contrast, the at least one projection is arranged in the at least one cavity with play such that the anti-pull-out device can move between the first and the second position.

Preferably, at least the first partial region and the second partial region, in particular the first protective element part and the second protective element part, each comprise at least one projection, which can each be inserted into a cavity in the stator, in particular one that is open at the front.

It may be that the rotor, in particular the first rotor element, covers the second form-fitting means, preferably the at least one projection, particularly preferably the projections, towards the front, so that the anti-pull-out device is axially fastened in the locking device. The first form-fitting means, preferably the at least one cavity, particularly preferably the cavities, are preferably designed to be closed at the rear.

The locking device has in particular a latching device to inhibit movement of the rotor towards the stator. In particular, the latching device is designed such that the latching device springs back parallel to a rotor axis of the locking device during a locking process. Thus, the latching device can move axially to a rotor axis. The latching device can produce a latching effect for certain rotational positions of the rotor at predetermined circumferential positions, for example when the key is turned to a closing position and/or to the start position. This gives the user haptic feedback. The latching effect is preferably produced when the key is in a start position.

Preferably, the rotor comprises a first portion and a second portion, wherein the first portion has a larger diameter than the second portion. The anti-pull-out device is preferably arranged in the first portion. The larger diameter in the first portion is specifically intended to provide the keyway.

The different diameters make it possible for the latching device to be arranged such that it can move axially. Additionally or alternatively, the diameter of the second rotor portion is smaller in order to arrange part of a locking mechanism in the stator and/or to be able to fasten the locking device during installation. For this purpose, it is particularly intended to design the stator with thicker walls in the region of the second rotor portion than in the region of the first rotor portion.

Preferably, the first rotor portion is designed as the first rotor element. The second rotor portion is designed as a second rotor element. The first and the second rotor element are in particular detachable from and rotationally fixed to each other. This means that the first and the second rotor element are at least indirectly secured to one another in a form-fitting and/or force-fitting manner. This can make the installation of the locking device easier. For example, during assembly, the first rotor element can be inserted into the stator from the front and the second rotor element from the back.

The rotor may thus preferably comprise the first rotor element and the second rotor element, wherein the first rotor element has a larger diameter than the second rotor element, wherein the anti-pull-out device is arranged in the first rotor element.

The first portion, in particular the first rotor element, can preferably be made of a harder or stronger material than the second portion, in particular the second rotor element. This can be used to provide protection against drilling, for example.

The locking device preferably further comprises an extension element, wherein the extension element assumes an insertion position when the key is inserted and a withdrawal position when the key is withdrawn. Thus, the extension element moves with the key. The extension element can thus extend the range of action of the key and extend it to the part of the locking device that is located behind the keyway.

For example, the extension element can bridge at least a distance between one end of the keyway and a coupling part of the locking device and/or a locking mechanism.

The extension element is preferably accommodated so as to be axially movable in the direction of the rotor axis. The extension element is preferably linearly movable.

If the extension element moves linearly, the extension element can alternatively be referred to as a slider.

Preferably, a mechanical energy store is provided that forces the extension element into the withdrawal position, wherein in the case of an inserted key, the anti-pull-out device in the second position prevents movement of the extension element from the insertion position into the withdrawal position against the force of the energy store. Thus, the elastic force of the anti-pull-out device, in particular the spring device, forces the anti-pull-out device into the second position more strongly than the energy store forces the extension element into the withdrawal position. Thus, the force of the energy store is not sufficient, in particular not alone, to push the extension element into the withdrawal position and thus partially push the key out of the keyway. Rather, a user must actively pull on the key to push the anti-pull-out device into the first position and withdraw the key.

The extension element is preferably used to interact with the key, in particular the electronic key. In addition, the extension element interacts with components of the locking device in such a way that, for example, an axial position of the extension element in or relative to the locking device determines the transfer of the state of the locking device, for example from a release state to a locking state. In the release state, in particular, the driver is rotatable, while in the locked state rotation of the driver is prevented.

Thus, the extension element serves as an active component for the interaction between the key and the components relevant for changing the state of the locking device. The extension element extends the effective range of the key.

The extension element preferably extends in the axial direction at least in the insertion position along an electronic control device, along the electrical actuator and/or past a locking element. The extension element therefore travels the essential length along the rotor axis of the closing device.

The locking device preferably has a blocking element, wherein a starting position and a release position can be assumed by the blocking element.

The locking device preferably comprises a locking element. In a first locking element position, the locking element prevents the rotor from rotating relative to the stator. In a second locking element position, the locking element allows the rotor to rotate relative to the stator. The locking element is movable between the first and the second locking element position.

The locking element can be movably mounted in the rotor. It can be provided that the stator comprises a locking element recess into which the locking element engages in the first locking element position. In the second locking element position, the locking element is disengaged from the locking element recess.

It is preferably provided that the blocking element in the release position allows the movement of the locking element from the first locking element position to the second locking element position and in a blocking position prevents the movement of the locking element from the first position to the second position. A starting position is a blocking position of the blocking element in which the blocking element is located when the locking device is not actuated. In particular, the key has been withdrawn.

Preferably, the blocking element comprises a cavity in which the locking element is arranged in the second locking element position. In the first locking element position, however, the locking element is outside the cavity. In the release position, the blocking element is arranged such that the cavity is opposite the locking element such that the locking element can move into the cavity. In the starting position, however, the cavity is arranged in such a way that the cavity points away from the locking element such that the locking element cannot move into the cavity.

The actuator preferably enables the locking element to be moved into the second locking element position.

The actuator preferably enables movement of the blocking element from the blocking position to the release position. The actuator can move the blocking element into the release position and/or, for example, cause the blocking element to move into the release position by tensioning a spring.

It can be provided that the blocking element is arranged on the output shaft of the actuator designed as an electric motor. Preferably, the actuator enables rotation of the blocking element from the blocking position to the release position. Preferably, the actuator rotates the blocking element from the blocking position into the release position. This allows for a very space-saving design.

Preferably, when the extension element is in the insertion position and the blocking element is in the release position, the extension element blocks movement of the blocking element into the starting position. For example, the extension element can have a stop, while a retaining cam is formed on the blocking element. In the insertion position of the extension element and the release position of the blocking element, the retaining cam rests against the stop so that movement of the blocking element from the release position is prevented.

Then, when the extension element is in the withdrawal position and the blocking element is in the release position, it can be provided that the extension element releases a movement of the blocking element to the starting position. If the key is withdrawn and the extension element moves from the insertion position back to the withdrawal position, the extension element moves out of the active position with the blocking element such that it is moved from the release position back to the blocking starting position. In this case, the stop can move out of the effective range of the retaining cam when moving from the insertion position into the withdrawal position.

The anti-pull-out device according to the disclosure prevents the extension element from being moved prematurely into the withdrawal position by the energy store and thus the blocking element from assuming a blocking position, in particular the starting position. This prevents the locking device from accidentally returning to the locked state prematurely. Rather, the user must first actively move the anti-pull-out device to the first position by pulling on the key. When the key is withdrawn, the extension element assumes the withdrawal position such that the blocking element returns to its original position. If, however, the user does not pull the key, the extension element remains in the insertion position against the force of the energy store and the blocking element remains in the release position.

The extension element and the blocking element are in particular designed such that in the insertion position a movement of the blocking element from the starting position to the release position is possible in a first direction of rotation and is blocked in a second direction of rotation, in particular wherein an angle of rotation between the starting position and the release position in the first direction of rotation is greater than an angle of rotation between the starting position and the release position in the second direction of rotation. This also provides protection against manipulation.

Furthermore, a spring element can be provided that forces the blocking element against the extension element in the release position.

The spring element can be designed to engage the blocking element, in particular directly.

The spring element can be tensioned in the release position of the blocking element and force the blocking element into a blocking position, in particular into the starting position.

The spring element can, for example, be designed as a torsion spring.

The extension element assumes the insertion position, in particular when the key is inserted, and when the key is withdrawn again, the extension element is returned to the withdrawal position. This also means that the extension element is movable between the insertion position and the withdrawal position, in particular linearly, wherein the extension element and the blocking element are designed such that the extension element in the withdrawal position enables a movement of the blocking element from the release position to a blocking position, in particular to the starting position. In the withdrawal position, the extension element may be out of operative connection with the blocking element, such that the blocking element moves from the release position to the blocking position under the force of the spring element.

Preferably, the extension element comprises an engagement element for engaging the key. This makes it possible for the extension element to always be moved from the insertion position to the withdrawal position when the key is withdrawn. This ensures that the extension element is always in the withdrawal position when the key is withdrawn. Thus, the engagement element is designed to be in operative connection with the key in such a way that the extension element can be moved, in particular pulled, from the insertion position into the withdrawn position when the key is withdrawn.

Preferably, the engagement element is designed to be elastic. Thus, the locking device preferably comprises the keyway for inserting a key, wherein the extension element comprises a elastic engagement element for engaging the key.

Preferably, the engagement element is designed to be in operative connection with the key under mechanical tension such that the extension element can be moved and in particular pulled from the insertion position into the withdrawal position when the key is withdrawn. Thus, the elastic effect forces the engagement element to disengage from the key.

The engagement element can comprise a sliding surface, wherein the engagement element is designed such that the sliding surface slides along a corresponding sliding surface of the key and thus the engagement element is released from operative connection with the key.

It can be provided that the engagement element is disengaged from the key by the elastic effect and/or by the sliding surface. Preferably, both the elastic effect and the sliding surface contribute to the engagement element disengaging from the key.

It is possible that the extension element can move into the withdrawal position by means of the engagement element if the energy store does not move the engagement element into the withdrawal position, for example if the energy store is manipulated.

The locking device is preferably used to lock a spatial region. In particular, the spatial region is fixed. For example, the spatial area may be a room in a building, such as an office, an apartment or a house, or a storage space, such as a cupboard, a postbox, a chest, a box, a safe or a drawer. In particular, the locking device is inserted into a particularly door-like locking element, for example a front door, an apartment door, a room door, a cupboard door, a letterbox flap or the front of a drawer, or to be attached to a locking element. Preferably, the stator of the locking device is at least indirectly connected to the closure element in a rotationally fixed manner.

The locking device may have a driver or be connectable to a driver. A rotation of the rotor of the locking device serves to rotate the driver.

The driver is preferably designed as an eccentric. The driver can be designed as a locking lug. It may be that a rotation of the driver in a first direction serves to transfer the locking element from an unlocked state to a locked state. It may also be the case that a rotation of the driver in a second direction transfers the locking element from a locked to an unlocked state. For example, the locking device can be inserted at least indirectly into a mortise lock. In this case, turning the driver can cause the bolt of the mortise lock to move. For example, rotation of the driver in a first direction can cause the bolt to extend and thus bring about the locked state of the locking element. A rotation of the driver in a second direction can, for example, cause the bolt to retract and thus bring about the unlocked state of the locking element.

Alternatively, the driver itself can act as a bolt. For example, rotation of the driver in a first direction can cause the driver to assume a locking position. Rotating the driver in a second direction, for example, can cause the driver to assume an unlocking position.

In a preferred embodiment, the locking device is designed as an installation device. The installation device is designed to be inserted into a closing device housing of a closing device. Preferably, the installation device is fixed in the closing device housing in a rotationally fixed manner by means of a fastening element. Thus, when the closing device is assembled, the stator of the locking device and the closing device housing form a common fixed unit. The closing device housing is used in particular for insertion into or attachment to the closure element. The closing device can be designed, for example, as a closing cylinder, in particular as a double cylinder or half cylinder, as a knob cylinder, as a furniture cylinder or as a padlock.

The locking device, in particular the rotor, can be connected or connectable to a key in order to transmit a mechanical torque to the rotor.

If the locking device is designed as an installation device, it is preferably provided that the locking device comprises a connecting portion in order to be connected to a driver.

Alternatively, it can be provided that the locking device itself is designed as a closing cylinder, in particular as a double cylinder or half cylinder, as a knob cylinder, as a furniture cylinder or as a padlock. The stator also serves as a housing for insertion into or attachment to the closure element.

Alternatively, the locking device can be provided for a switching element. This means that the switching element can only be operated by authorized users. The driver can be used to operate a switch or button. Thus, the locking device can be installed in a switching element, in particular in a key switch, or can correspond to a key switch.

The locking device may comprise an electronic control device, in particular a processor and/or a controller, to control the actuator. The control device may further comprise an electronic memory.

The locking device may comprise a transmission device. The transmission device can be designed as a transmitting and receiving unit and/or as a contact element for electrically contacting a key, in particular an electronic key. The transmitting and receiving unit can be designed to communicate with the key via wireless short-range communication, in particular RFID or Bluetooth Low Energy.

The transmission device can be used to send and/or receive electronic data that make it possible to determine a user's authorization to unlock the spatial region. For example, the transmission element can receive an authorization code and/or an authorization time window, which is verified by the control device. If the authorization returns a positive result, the actuator can be controlled to enable movement of the blocking element. The actuator is controlled to allow the locking element to move into the second position.

Alternatively, the transmission device can receive an opening command, based on which the locking element is electromechanically moved into the second position or electromechanically released from movement into the second position.

The transmission device serves in particular additionally or alternatively to transmit electrical energy to the locking device. The electrical energy can be provided for operating the actuator and/or the control device. The electrical energy can be transferred from a battery of the key to the locking device by means of the transmission device.

The disclosure is further directed to a closing device with a locking device as described above, wherein the closing device comprises a closing device housing, wherein the locking device is accommodated in the closing device housing. Thus, the locking device is designed as an installation device. The locking device can be fastened in the closing device housing by means of a fastening element. For this purpose, the locking device can comprise an opening.

The closing device can be designed with a locking device and with a coupling part. Preferably, the coupling part is designed in several parts, wherein a first part of the coupling part is designed to be moved by the extension element when the extension element moves from the withdrawal position into the insertion position, wherein a second part of the coupling part is provided to be connected to the driver in a rotationally fixed manner, wherein the first part and the second part are connected elastically, in particular via a spring.

The disclosure also relates to a closing system. In addition to the locking device according to the disclosure and/or the closing device according to the disclosure, the closing system comprises a key.

The key may comprise a first sliding portion to interact with the first sliding portion of the anti-pull-out device. The key may comprise a second sliding portion to interact with the second sliding portion of the anti-pull-out device.

The key may comprise a recess to accommodate the anti-pull-out device, preferably the annular bent region, particularly preferably the protective element parts.

The key may comprise a cavity for engagement by the extension element.

The key may comprise at least one portion, preferably a plurality of portions, to interact with the engagement element. In particular, a first portion moves the engagement element into the cavity when the key is inserted. A second portion can be used to move the engagement element out of the cavity when the key is withdrawn.

The key may comprise an electrical, in particular electrochemical, energy store to supply the locking device with electrical energy.

The key may comprise an electronic device for storing electronic data and/or for verifying access authorization.

Preferred exemplary embodiment of the disclosure

BRIEF DESCRIPTION OF THE DRAWINGS

The disclosure will be described below in more detail on the basis of an exemplary embodiment. Technical features with identical functions are provided with identical reference numerals in the figures. In the figures.

DETAILED DESCRIPTION OF THE DRAWINGS

Figure 1:
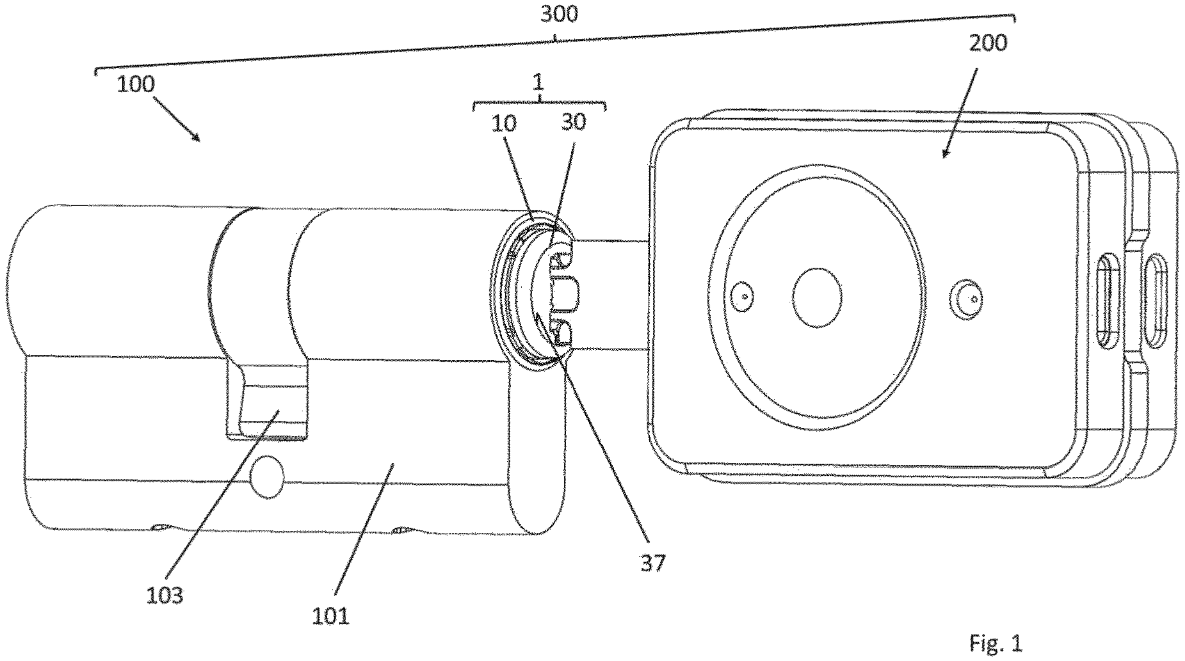
FIG. 1 shows a closing device according to the disclosure and a key, which together form a closing system according to the disclosure.
Figure 2:
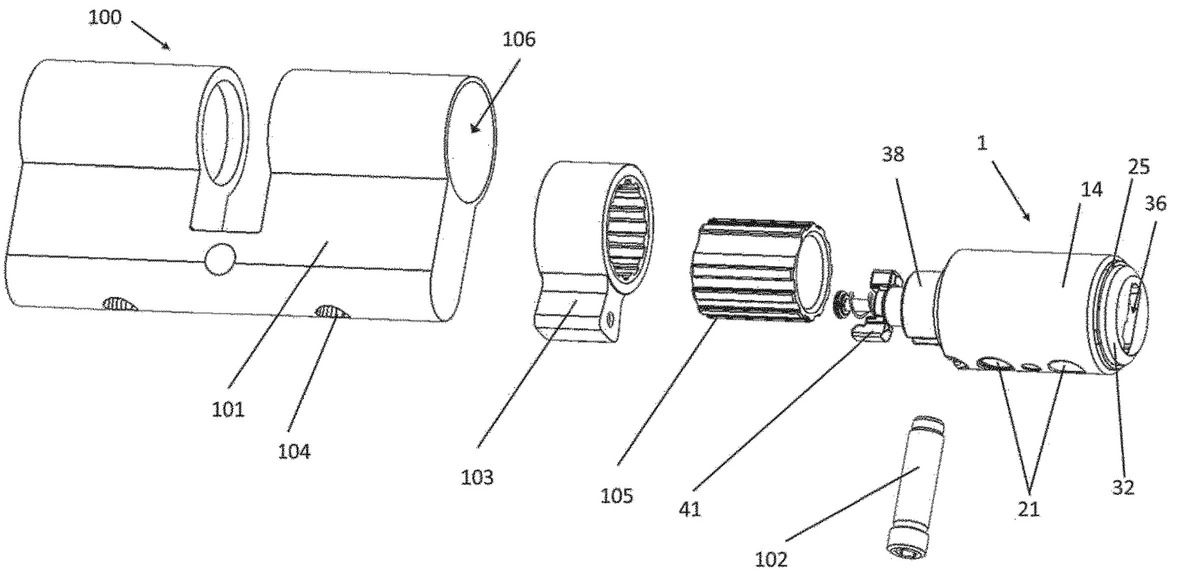
FIG. 2 shows the closing device from FIG. 1 in a partially disassembled state, with a perspective view of a locking device according to the disclosure, which is designed as an installation device.

FIG. 1 and FIG. 2 show a closing device 100 in the form of a closing cylinder, as used in mortise locks, in order to unlock a building door as a closure element or to lock it by means of a bolt. For this purpose, the closing device 100 has a housing 101 with a recess in which a driver 103, which is designed as a locking lug, is rotatably arranged. The driver 103 moves a bolt in the locking or unlocking direction.

In the right half of the housing 101, a locking device 1 designed as an installation device according to an embodiment of the disclosure is inserted. The installation device 1 comprises a stator 10 arranged on the outer circumference, in which a rotor 30 of the installation device 1 is inserted so as to be rotatable about a rotor axis 35, which, for example, corresponds to the axis of rotation of the driver 103. The rotor 30 comprises, on its front side 37 facing away from the driver 103, a keyway 36 for inserting a shaft of a key 200. The key 200 together with the closing device 100 according to the disclosure forms a closing system 300 according to the disclosure.

The key 200 carries an electronic locking secret in the form of electronic data. The locking secret can be used to determine a user's authorization to unlock the door. The key 200 is preferably designed without a mechanical coding. Therefore, only the electronic locking secret can be used to determine whether the user has authorization or not. The keys and the locking devices can be identical in terms of their external shape and thus also mechanically. The key 200 further comprises a battery (not shown) to supply the locking device with electrical energy.

FIG. 2 shows the closing device 100 in a partially disassembled state. The housing 101 has, for example in both halves of the recess for the driver 103 in the lower region, recesses 104, of which the right-hand recess is provided with a reference numeral. The recesses 104 shown here extend perpendicular to the axis of rotation of the driver 103. The driver 103 has, for example, an inner contour that is not circular in cross-section, for example in the form of an internal toothing, into which an insert 105 preferably engages in a form-fitting manner. For this purpose, the insert 105 has an outer contour that is complementary to the inner contour of the driver 103, here in the form of an external toothing, such that both parts 103, 105 are arranged in a rotationally fixed manner with respect to one another.

A connecting portion 38 of the locking device 1 projects into the insert 105. In the connecting portion 38, a coupling part 41 is slidably arranged in a guide 42. The coupling part 41 is designed in several parts and, depending on the position of the coupling part 41, can establish or release an operative connection between the rotor 30 and the driver 103, in particular via the insert 105. For this purpose, the coupling part 41 of the closing device 100 can engage in a form-fitting manner in an inner contour (not shown) of the insert 105. The guide 42 preferably forms a linear guide for the coupling part 41, such that the coupling part 41 is arranged to be guided and movable along the rotor axis 35 of the rotor 30.

The installation device 1 has a casing 14 with which the installation device 1 is inserted into an associated insertion opening 106 of the housing 101. A fastening element 102 in the form of a screw is screwed through the recess 104 on the right here from the underside of the housing 101 and through an opening 21 on the left here of the casing 14 of the stator 10 and of a stator body 11 of the stator 10, which will be explained in more detail later. The screw 102 thus fixes the stator 10 in the housing 101. Furthermore, the keyway 36 for inserting the key 200 is designated here, which is formed in a first rotor element 32 of the rotor 30.

Figure 3:
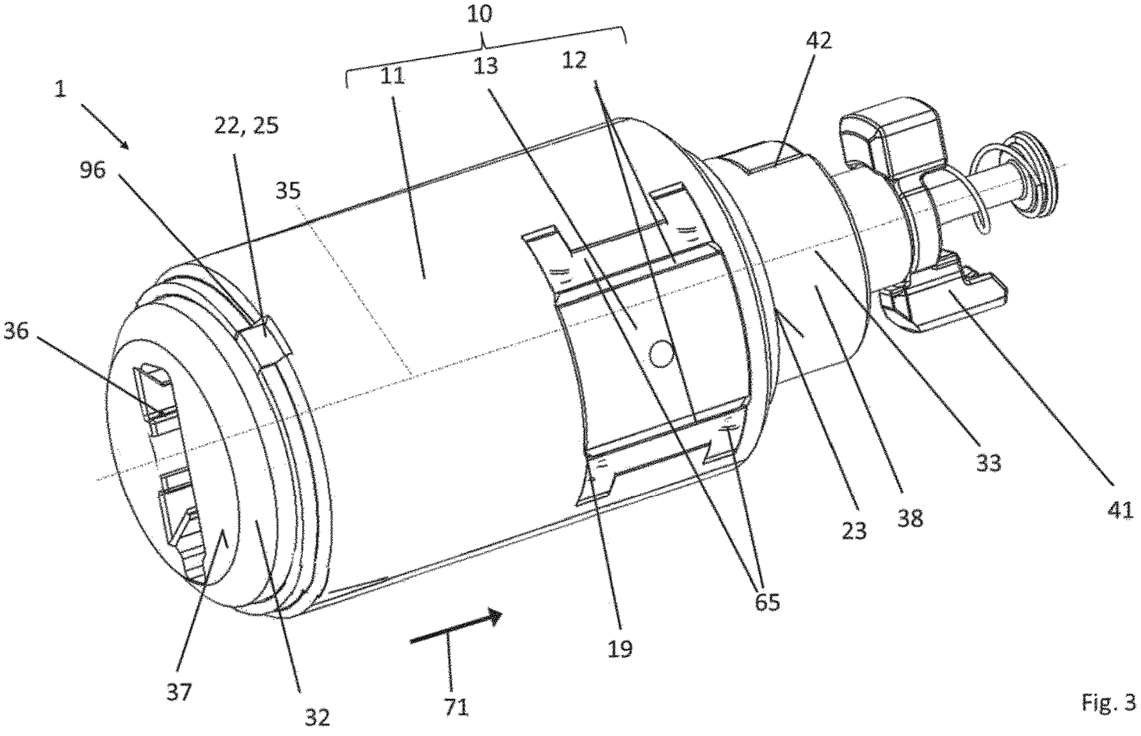
FIG. 3 shows the locking device according to the disclosure from FIG. 2 without casing and a coupling part.

FIG. 3 shows the installation device 1 without the casing 14. The stator body 11 is also designed as a type of sleeve and has functional structures on the inside. The stator body 11 has a cavity 19 into which a stator insert element 13 is inserted. Stator elements 12, which will be explained in more detail later, are attached or arranged on a side of the stator insert element 13 facing the interior of the stator body 11. The stator elements 12 are movably mounted on the stator insert element 13 and the stator body 11. The stator elements 12 remain in the rest of the stator 10 when the rotor 30 rotates.

The rotor 30 comprises the first rotor element 32 and a second rotor element 33.

The rotor 30 is rotatable in the stator body 11 of the stator 10, but is fixed in the direction of its rotor axis 35, which runs parallel to the insertion direction of the key 200 into the keyway 36. The coupling part 41 is arranged in a rotationally fixed manner on the second rotor element 33 of the rotor 30 of the installation device 1. Both rotor elements 32, 33 are reversibly detachably attached to each other and arranged to rotate in the stator body 11.

The second rotor element 33 has the guide 42 into which the coupling part 41 engages and is thus arranged in a rotationally fixed manner to the second rotor element 33. The second rotor element 33 is inserted into the stator body 11 from a base side 23 of the stator 10, preferably without the first rotor element 32 during assembly.

According to the disclosure, the locking device 1 comprises an anti-pull-out device 22, of which a projection 25 of several projections is shown in FIG. 3, which engage in corresponding recesses 96 of the stator 10. The recesses 96 thus serve as a first form-fitting means and the projections 25 as a second form-fitting means. Due to the form-fitting means, the anti-pull-out device does not rotate with the rotor 30, but remains essentially stationary in the stator 10.

Figure 4:
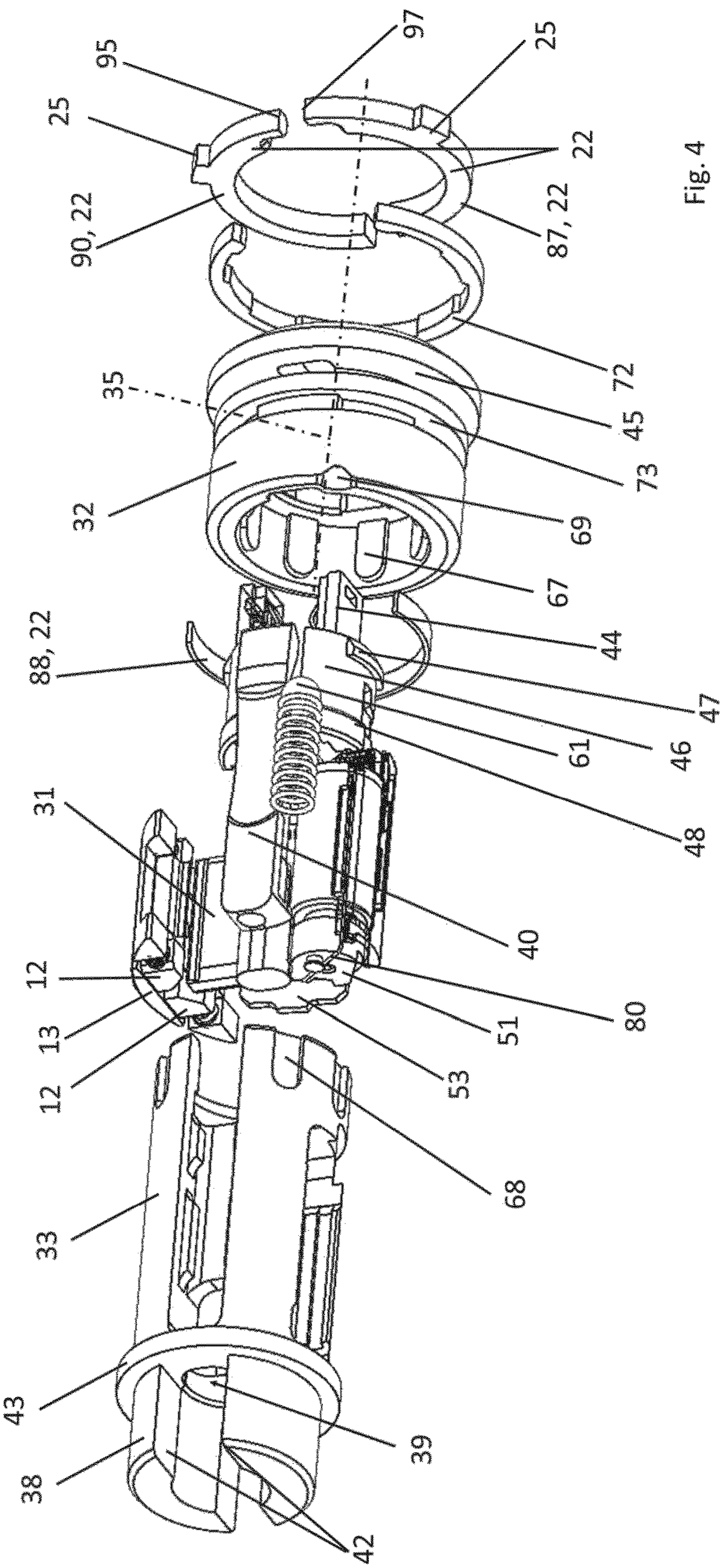
FIG. 4 shows a locking device from FIG. 3 without casing and stator body in an exploded view showing the anti-pull-out device according to the disclosure.

FIG. 4 shows the locking device 1 without casing 14 and stator body 11 in a partially disassembled state, in which the individual elements are displaced against each other similar to an exploded view.

The anti-pull-out device 22 is shown on the right in FIG. 4. The anti-pull-out device 22 has a first protective element part 87 and a second protective element part 90. The protective element parts 87 and 90 have the shape of a half ring and/or have a rectangular ring cross-section. The protective element parts 87, 90 are formed separately from each other and are not directly connected to each other. On the outer circumferential surface of the protective element parts 87 and 90 there are projections 25 that engage cavities 96 in the stator when the protective element parts 87 and 90 are mounted thereon.

The anti-pull-out device 22 is thus annular. The protective element parts 87, 90 together form an annular bent region of the anti-pull-out device 22.

Figure 8:
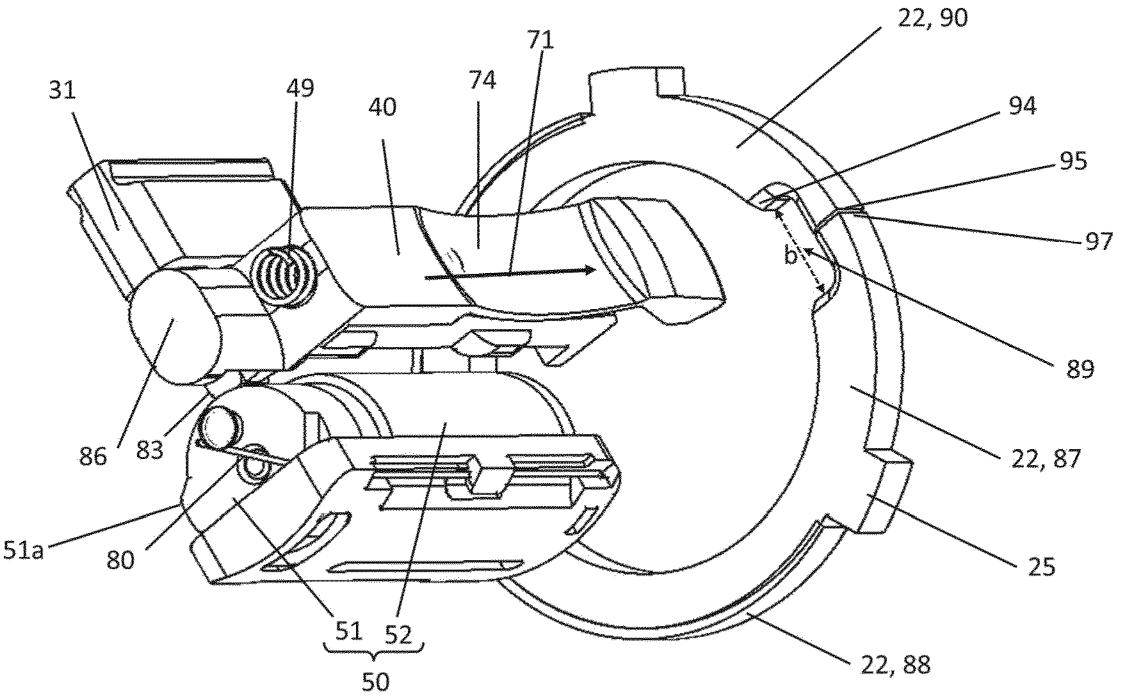
Figure 9:
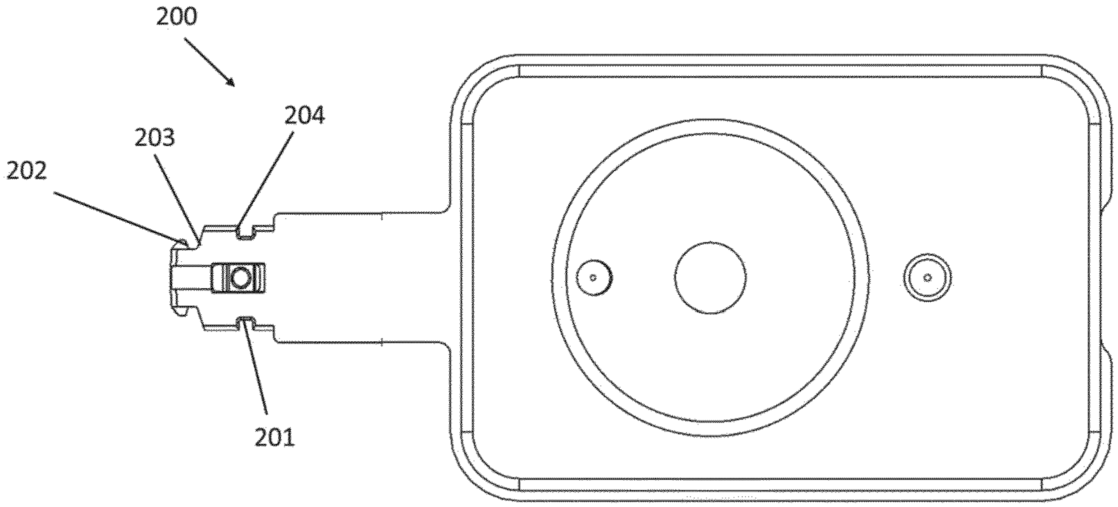
FIG. 9 shows a key for the locking and/or closing device according to the disclosure and FIG. 10 shows a slightly perspective front view of a locking device according to the disclosure without a first rotor element.

The anti-pull-out device 22 has a gap 89 at a circumferential position (see FIG. 8). The key 200 can be inserted into the keyway 36 through the gap 89. The key 200 has a recess 201 for engagement of the anti-pull-out device 22 (see FIG. 9).

If the key 200 is inserted through the gap 89 into the keyway 36, the key 200 initially assumes a start position. The key 200 can then be rotated together with the rotor 30. The key assumes different rotational positions in relation to the stator 10 and thus in relation to the anti-pull-out device 22. If the key 200 is rotated relative to the starting position, the anti-pull-out device 22 engages in the recess 201 of the key 200. As a result, the key 200 engages behind the anti-pull-out device 22, so that withdrawal of the key is prevented. The key is in a locking position.

If the key 200 is inserted into the keyway 36, the key 200 can engage behind the protective element parts 87 and 90 in the locking positions when rotated, so that the key 200 cannot be withdrawn. Only when the key 200 again assumes the start position does the recess 201 again come out of engagement with the anti-pull-out device 22, so that the key 200 can be withdrawn. Thus, the anti-pull-out device 22 and the key 200 interact like a bayonet lock.

According to the disclosure, the withdrawal of the key 200 is inhibited even in the start position. For this purpose, the anti-pull-out device 22 is designed to be spring-loaded. In the exemplary embodiment, the anti-pull-out device comprises a spring device 88. The spring device 88 presses the protective element parts 87 and 90 together. If the protective element parts 87 and 90 are pressed together by the spring device 88, the gap 89 is changed such that insertion or withdrawal of the key 200 is inhibited. This is achieved by reducing the gap 89 such that the width b of the gap 89 is less than the width of the key 200 at the level of the recess 201. The width of the key can be seen in FIG. 9 perpendicular to the plane of the page. Of course, the key 200 can have a different width, in particular in the height of the bow. The spring device 88 presses the two protective element parts 87 and 90 together in the region of the gap 89. This corresponds to the second position of the anti-pull-out device 22. If, however, the key 200 is inserted, the protective element parts 87 and 90 spring up slightly, increasing the gap b, so that the anti-pull-out device 22 assumes the first position The gap 89 thus has a larger gap dimension b in a first position for inserting the key 200 than in a second position, so that in the second position of the anti-pull-out device 22 the withdrawal of the key 200 is inhibited.

The first position of the anti-pull-out device 22 is the position of the protective element parts 87 and 90 in which the width b of the gap 89 is greater than or equal to the width of the key 200. The second position of the anti-pull-out device 22 is the position of the protective element parts 87 and 90 in which the width b of the gap 89 is smaller than the width of the key 200. The second position is taken when the key is outside the keyway 36. The second position is assumed when the key is already completely inserted into the keyway 36, such that rotation of the key 200 causes the anti-pull-out device 22 to engage in the recess 201. The first position is taken during insertion or withdrawal of the key 200. The key 200 presses the protective element parts 87, 90 apart against the force of the spring device 88 and thereby enlarges the gap 89.

In other words, the protective element parts 87, 90 can be pressed apart against the force of the spring device 88. This makes the gap b equal to or larger than the width of the key 200 so that the key can be inserted or withdrawn.

Figure 10:
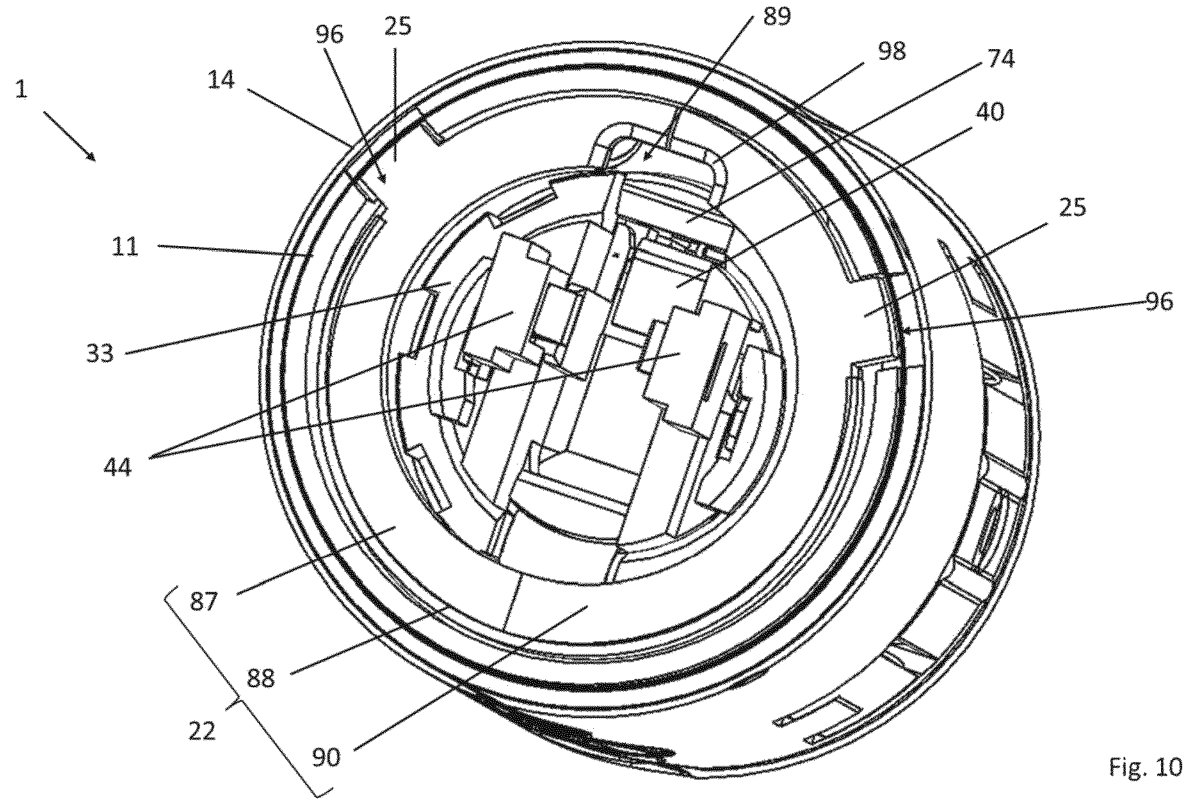

The anti-pull-out device 22 has a first sliding surface 98 in FIG. 10 in order to be moved into the first position against the force of the spring device 88 when the key 200 is inserted. The anti-pull-out device 22 comprises a second sliding surface 94 in order to be moved into the first position when the key 200 is withdrawn against the force of the spring device 88 (see FIG. 8).

The key 200 accordingly comprises a first sliding portion 203 for interacting with the first sliding surface 98 and/or a second sliding portion 204 for interacting with the second sliding surface 94.

The spring device 88 is designed as a leaf spring adapted to the contour of the anti-pull-out device 22. Thus, the entire anti-pull-out device 22 is designed to be bent in an annular manner.

The anti-pull-out device 22 has a first and a second end 95, 97 at the gap 89. The first protective element part 87 comprises the first end 95 and the second protective element part 90 comprises the second end 97. In the first position of the anti-pull-out device 22, the ends 95, 97 are spaced apart from each other. In the second position, which is shown in FIGS. 8 and 10, the ends 95, 97 abut one another, so that the width b of the gap 89 is defined by the abutment. The ends 95, 97 thus serve as a first and a second stop of the anti-pull-out device 22, by which the width b of the gap in the second position is defined.

The projections 25 lie with play in the cavities 96 such that a movement of the protective element parts 87, 90 from the first position to the second position and vice versa is possible.

The anti-pull-out device 22 is inserted into a groove 45 of the rotor 30, in particular of the first rotor element 32. This results in a simple assembly, since the spring device 88 clamps the anti-pull-out device 22 to the first rotor element 32 similar to a snap ring. However, the rotor 30 can be rotated without the anti-pull-out device 22 rotating, such that during rotation of the key 200 the anti-pull-out device 22 is fixed in the stator 10.

In both the first position and the second position, the anti-pull-out device 22 is fixed in the stator 10 in a rotationally fixed manner, but with play.

The spring device 88 is adapted to the contour of the remaining anti-pull-out device 22 and is applied to the outside circumference thereof. Thus, the anti-pull-out device 22 is designed in such a way that it is particularly small and easy to install.

For the same reason, the rotor 30 comprises the first and second rotor elements 32, 33.

During assembly, the first rotor element 32 can be inserted into the stator 10 from the front side 37. The first rotor element 32 is fixed axially in and against the direction of the arrow 71 by a snap ring 72. The snap ring 72 is arranged in a groove 73 of the first rotor element 33.

An end surface 66 covers an outer surface of the stator 10. As a result, the first rotor element 32 also prevents the anti-pull-out device 22 from being withdrawn forwards from the locking device 1 in the opposite direction to the arrow direction 71.

The anti-pull-out device 22 with the first protective element part 87 and the second protective element part 90 is inserted into the groove 45, which borders on the end surface 66.

A circumferential projection 43 (see FIG. 4) of the second rotor element 33, here as a collar, serves as a stop of the second rotor element 33 on the stator 10. The second rotor element 33 can be inserted from a base side 23 of the stator 10 until the projection 43 rests against the base side 23. The projection 43 is preferably formed integrally with the second rotor element 33. Due to the one-piece design, the second rotor element 33 can only be inserted into the stator 10 from the base side 23.

By the projection 43 abutting against the base side 23, the second rotor element 33 is fixed axially towards the front side 37 against the direction of the arrow 71. The second rotor element 33 is inserted into the stator 10 from a base side 23 of the stator 10 during assembly without the first rotor element 32.

After insertion, the first and second rotor elements 32, 33 are connected to one another in a rotationally fixed manner, in particular in a reversibly detachable manner. Due to the division into rotor elements 32, 33, assembly of the rotor 30 is particularly easy. By connecting the two rotor elements 32, 33, the resulting rotor 30 is axially fixed forwards and backwards, i.e. with and against the direction of the arrow 71.

The first rotor element 32 comprises fastening means 67 and the second rotor element 33 comprises corresponding fastening means 68, which engage in a form-fitting manner so that the first rotor element 32 and the second rotor element 33 are fastened to one another in a rotationally fixed manner. Here, the first and second fastening means 67, 68 are designed as projections and corresponding recesses.

As a transmission device 44, the locking device 1 comprises contact elements that transmit data and/or electrical energy to the locking device 1 via an electrical contact with the key 200. The contact elements 44 are spring-mounted on a housing 46.

The housing 46 also axially fastens the rotor elements 32, 33 to one another. For this purpose, the housing 46 comprises a first latching element 47 that latches into the first rotor element 32. For this purpose, the first rotor element 32 comprises an edge 78. The housing 46 comprises a second latching element 48 that latches into the second rotor element 33. For this purpose, the second rotor element 33 comprises a groove 77.

The first rotor element 32 has a larger diameter than the second rotor element 33. As a result, the part of the stator body 11 that surrounds the second rotor element 33 is formed with a greater wall thickness than the part of the stator body that surrounds the first rotor element 32.

Both the first rotor element 32 and the second rotor element 33 are designed to suit their functions.

The first rotor element 32 has a large diameter so that the anti-pull-out device 22 can be arranged on the first rotor element 32. In addition, the first rotor element 32 houses the keyway 36.

On the other hand, the opening 21 is provided in the part of the stator 10 that surrounds the second rotor element 33. The opening 21 is formed both in the shell 14 and in the stator body 11. Here, the opening 21 is formed in the part of the stator 10 with the greater wall thickness, so that a secure fastening of the installation element 1 in the closing device housing 101 is provided.

The locking device 1 has a latching device 61 to inhibit a movement of the rotor 30 towards the stator 10, wherein the latching device 61 springs back parallel to a rotor axis 35 of the locking device 1 during a latching process. The latching element 61 is arranged in the stator 10 and engages in a recess 69 of the first rotor element 32. The axial mobility of the latching device 61 is made possible by the different diameters of the rotor elements 32, 33. The latching device 61 provides haptic feedback when the key 200 is in the start position.

The rotor elements 32, 33 can be made of different materials. For example, the first rotor element 32 is made of a harder or more (wear-) resistant material than the second rotor element 33. This is particularly useful because the first rotor element 32 is designed to accommodate the key 200 and is therefore exposed to greater mechanical loads than the second rotor element 33. This also makes it easy to provide protection against drilling. For example, the first rotor element 32 may be made of a ceramic material.

FIG. 4 shows an extension element 40 designed to interact mechanically with the key 200. If the key 200 is inserted into the keyway 36, it moves the extension element 40 axially or parallel to the rotor axis 35 in the direction of the second rotor element 33 upon contact. The extension element 40 can be moved linearly between a withdrawal position and an insertion position. When the key 200 is inserted, the extension element 40 assumes the insertion position in which the extension element 40 is displaced in the direction of the driver 103 compared to the withdrawal position. When the key 200 is withdrawn, the extension element 40 assumes the withdrawal position.

The extension element 40 moves the coupling part 41 (see FIG. 2) away from the rotor 30 in the direction of the driver 103 such that the coupling part 41 can come into rotational engagement with the driver 103. A passage 39 is provided in the connecting portion 38 such that the extension element 40 can come into contact with the coupling part 41. Either the extension element 40 or the coupling part 41 can protrude through the passage 39. The extension element 40 will be described in more detail later in connection with FIGS. 7 and 8.

The transmission device 44, here for example in the form of contact elements, is spring-mounted on the housing 46. This makes it possible to read electronic data, for example authentication information or an opening command, from the key 200 or to receive it from the key 200. An electronic control device 53 in the form of an electrical circuit board is coupled to the transmission device 44 in order to read out the data and, if necessary, evaluate it. If the check of the control device 53 shows that the user of the key 200 is authorized to open the associated door and/or if the control device 53 has an opening command, an electromechanical actuator assembly 50 is activated.

The actuator assembly 50 comprises an electromechanical actuator 52, here in the form of an electric motor, on the output shaft of which a blocking element 51 is arranged in a rotationally fixed manner.

The actuator assembly 50 with the electromechanical actuator 52 in the form of the electric motor and with the blocking element 51 on its output shaft has a spring element 80. The spring element 80 interacts with the blocking element 51 in such a way that when the blocking element 51 moves from the starting position into the release position, i.e. when the blocking element 51 is rotated, the spring element 80 is at least temporarily tensioned in such a way that the spring element 80 pushes the blocking element 51 back in the direction of the starting position, i.e. rotates it back into a certain rotational position. A more detailed description of the interaction of the spring element 80 with the blocking element 51 follows in connection with FIG. 5.

Figure 5:
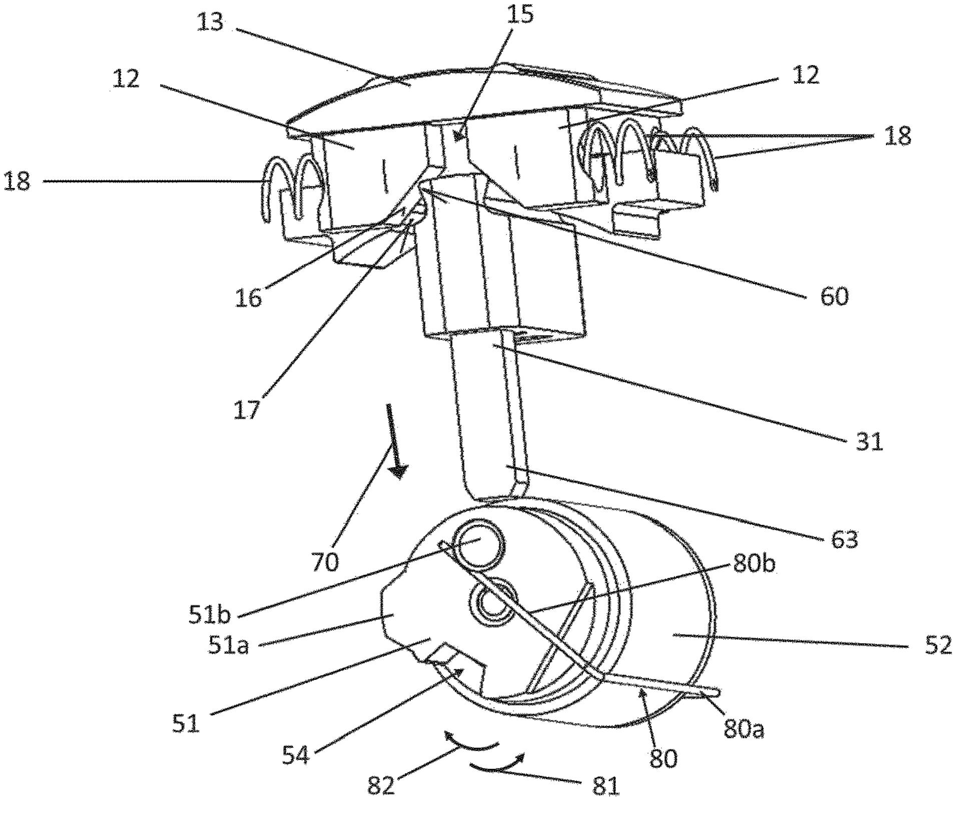
FIG. 5 shows selected elements of the locking device from FIG. 4.

Furthermore, as shown in further conjunction with FIG. 5, a locking element 31 is provided, which is mounted in the second rotor element 33 so as to be movable towards and away from the blocking element 51, preferably perpendicular to the rotor axis 35. In a first locking element position shown here, the locking element 31 is located in a locking element recess 15 formed by the stator insert element 13 and the stator elements 12. This prevents the second rotor element 33 and thus the coupling part 41 from being rotated. Turning the inserted key 200 to unlock the corresponding lock is thus prevented. In a second locking element position of the locking element 31 (not shown), the latter comes out of engagement with the locking element recess 15 of the stator 10. This makes it possible to rotate the rotor 30 in the stator 10 and thus the driver 103 in order to actuate the closing device and to release the closing mechanism.

Figure 6:
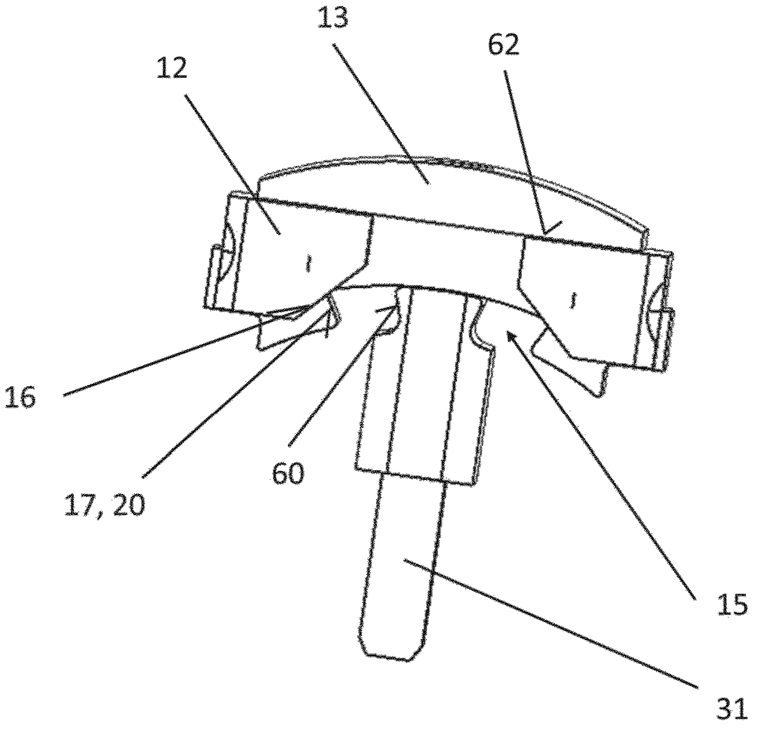
FIG. 6 shows selected elements of the locking device from FIG. 4 in a side view.

FIGS. 5 and 6 show selected elements of the locking device 1 from FIG. 4. FIG. 5 shows the arrangement of the locking element 31 in relation to the blocking element 51 and the stator insert element 13 together with stator elements 12. The blocking element 51 is rotatable between a release position in which the cavity 54 is opposite the locking element 31 such that the locking element 31 can move into the cavity 54 and a blocking position in which the cavity 54 is not opposite the locking element 31 such that the locking element 31 is prevented from moving into the cavity 54. FIGS. 4 and 5 show blocking positions of the blocking element 51. A starting position of the blocking element 51 corresponds to a blocking position in the unactuated state of the locking device 1.

The locking element 31 is designed at its contact portion 63 facing the blocking element 51 to be able to move into the cavity 54 when the blocking element 51 is in the release position and the cavity 54 is opposite the contact portion 63 of the locking element 31, i.e. points upwards in FIG. 5. This makes it possible for the locking element 31 to reach the second locking element position.

A first contact surface 16 of the stator elements 12 facing the locking element 31 is designed to force the locking element 31 in the direction of the blocking element 51 as the rotor 30 continues to rotate, i.e. into the second locking element position, in which the rotor 30 is freely rotatable relative to the stator 10. The first contact surface 16 is designed as an inclined surface that forces the locking element 31 into the second locking element position.

The stator elements 12 are movably mounted on the stator insert element 13 between a first position and a second position. The stator elements 12 are forced into the first position by means of springs 18. The springs 18 are mounted in the stator 10. The movement of the stator elements 12 from the first position to the second position is perpendicular to the direction of movement 70 of the locking element 31.

During a process for unlocking the rotor 30 relative to the stator 10, the locking element 31 is initially located in the locking element recess 15. The locking element 31 is guided in the rotor 30. In addition, the locking element 31 rests on the first contact surfaces 16 of the stator elements 12. This centres the locking element 31. This locking element position of the locking element 31 is called the rest position. In the rest position, the locking element 31 is preferably arranged at a distance from the blocking element 51.

A user now wants to unlock the door and inserts the key 200 into the keyway 36. This starts an electronic communication between the key and the control device 53, which electronically determines whether the user is authorized.

If the user is authorized to unlock the door, the control device 53 controls the actuator 52. The actuator 52, designed as an electric motor, rotates the blocking element 51 into the release position in which the cavity 54 is opposite the locking element 31. If the rotor 30 is now set in rotation by means of the key 200, the locking element 31 slides along one of the first contact surfaces 16 into the second locking element position, in which the locking element 31 engages in the cavity 54, wherein the locking element 31 is pretensioned into the locking element recess 15 by springs (not shown). The locking element 31 then moves in the direction of movement 70 due to the rotation of the rotor 30.

The stator elements 12 remain in the first position. This is made possible by the fact that the springs 18 exert a higher force on the stator element 12, along which the locking element 31 slides, than the springs (not shown) which urge the locking element 31 upwards into the locking element recess 15.

The rotor 30 can now rotate freely. The locking element 31 slides along that of the first contact surfaces 16 into which the locking element 31 is rotated. The locking element 31 is surrounded by the first contact surfaces 16 in both directions of rotation, so that rotation in both directions when it rests on one of the first contact surfaces 16 allows the locking element 31 to move into the second locking element position.

As shown in FIG. 6, the stator 10 has second contact surfaces 17 that leave the locking element 31 in the first locking element position. The second contact surfaces 17 are used functionally when the user is not authorized to unlock the door. The second contact surfaces 17 are formed in or on the stator insert element 13. If the locking element 31 is in the rest position, the second contact surfaces 17 are further away from the locking element 31 than the first contact surfaces 16.

Preferably, the second contact surfaces 17 are also inclined, but opposite to the first contact surfaces 16 with respect to the direction of movement 70 of the locking element 31. The second contact surfaces 17 thus form an obtuse angle to the direction of movement 70 of the locking element 31.

At its end facing the stator insert element 13, the locking element 31, viewed along the axis of rotation of the blocking element 51 and/or the rotor axis 35, has a cross-section in the shape of a symmetrical trapezoid tapering in the direction of the blocking element 51. The legs of this trapezoid form head surfaces 60 on the outside in relation to the locking element 31. The head surface 60 and the corresponding contact surface 17 are inclined to the direction of movement of the locking element 31.

If the user is not authorized to unlock the door, the following procedure occurs. The locking element 31 is initially in the rest position. A key 200 without locking authorization is inserted into the keyway 36. The electronic data exchange shows that there is no authorization to unlock the door. Therefore, the actuator 52 is not activated and the blocking element 51 remains in a blocking position in which the cavity 54 is not opposite the locking element 31, as shown in FIGS. 4 and 5. Rather, an outer circumference of the blocking element 51 is opposite the locking element 31.

If the rotor 30 is rotated, the locking element 31 tries to slide along the first contact surface 16. However, this is not possible because the locking element 31 rests on an outer circumference of the blocking element 31. Thus, the locking element 31 cannot be pushed into the second locking element position against the force of the springs (not shown).

Instead, the stator element 12, which is located in the direction of rotation of the locking element 31, is pushed back by the locking element 31 against the force of the spring 18 until the locking element 31 rests against the second contact surface 17. The stator element 12 is now in the second position. In this case, the head surface 60 of the locking element 31 comes into contact with the corresponding second contact surface 17 opposite one of the legs of the trapezoid. If an attempt is made to turn the rotor 30 with force using the key 200, the arrangement shown does not generate a higher force from the locking element 31 on the blocking element 51.

The contact surface 17 is designed such that the contact surface 17 holds the locking element 31 in the first locking element position. Thus, the rotor 30 remains blocked by the locking element 31, so that the door cannot be unlocked.

If an attempt is made to rotate the rotor 30 further, the locking element 31 slides away from the blocking element 51 against the direction of movement 70. This is achieved by the inclination of the second contact surface 17. The locking element 31 can slide with the head surface 60 along the second contact surface 17. Thus, the locking element 31 and the blocking element 51 can be spaced apart from each other when they rest on the second contact surface 17. Additionally or alternatively, the forces acting on the locking element 31 during a further attempted rotation of the rotor 30 are diverted into the second contact surface 17. This is helped by the fact that the head surfaces 60 correspond to the second contact surfaces and thus the locking element 31 lies flat against the second contact surface.

The locking element recess is provided with the reference numeral 15. FIG. 6 shows the arrangement of FIG. 5 seen from one end of the locking element 31, only without the blocking element 51. Here, the stator elements 12 are in the second position. The same reference numerals in FIG. 6 are deemed to be described in FIG. 6 due to the description of FIG. 5.

Furthermore, with regard to FIG. 5, the spring element 80 designed as a torsion spring is shown, which surrounds the blocking element 51 and the electromagnetic actuator 52. The spring element 80 is rigidly clamped on the rear side with its end portion there in a manner not shown, and the spring element 80 has a torsion leg 80*a* that merges into a contact leg 80*b* angled approximately 90° from this and pretensioned against a pin 51*b* on the blocking element 51. The pretension of the contact leg 80*b* against the pin 51*b* is effected via the torsion of the torsion leg 80*a* such that the blocking element 51 is rotationally pretensioned into the starting position shown here, in which the blocking element 51 prevents movement of the locking element 31 and the rotor 30 is not rotatable in the stator 10. In this position, the cavity 54 is not aligned with the locking element 31.

If the electromechanical actuator 52 is energized, the blocking element 51 is rotated anti-clockwise in the view shown here, such that the pretension in the torsion leg 80*a* of the spring element 80 changes as a result of this rotation and finally decreases again after passing through a dead centre. By this rotation of the blocking element 51, the cavity 54 can be rotated into the corresponding release position with the locking element 31. In order to lock the release position of the cavity 54 corresponding to the locking element 31, a stop 83 is provided, which is explained in more detail in connection with FIG. 7 and against which a retaining cam 51*a* of the blocking element 51 can come to rest.

Starting from the starting position, the blocking element 51 can be movable in a first direction, in particular a first direction of rotation 81, and in a second direction, in particular in a second direction of rotation 82, wherein the spring element 80 and the blocking element 51 interact in such a way that the spring element 80 is at least temporarily tensioned both during a movement in the first direction and during a movement in the second direction, wherein in particular the spring element 80 is designed as a torsion spring.

The stop 83 of the extension element 40 interacts with a retaining cam 51*a* of the blocking element 51. If the blocking element 51 is rotated into the release position, the retaining cam 51*a* can be loaded against the stop 83 when the extension element 40 is in the insertion position. This holds the blocking element 51 in the release position.

If the extension element 40 is moved back into the withdrawal position against the direction of movement 71, the stop 83 comes out of engagement with the retaining cam 51*a*. The blocking element 51 then rotates back to the starting position, wherein the reverse rotation is effected by applying force to the spring element 80. The rotation also occurs anti-clockwise according to the arrow 81. Thus, in the withdrawal position, the extension element allows movement of the blocking element 51 by means of the spring element 40 into the starting position.

Without manipulation, the blocking element 51 always rotates anti-clockwise 81.

Figure 7:
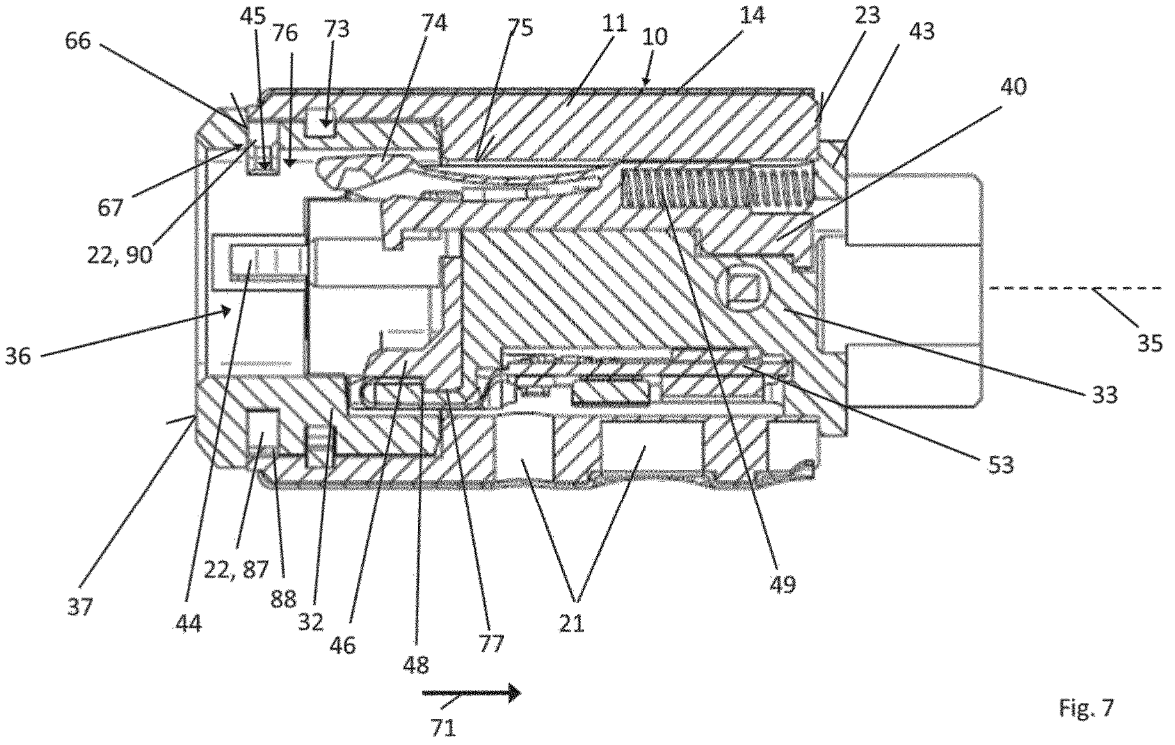
FIG. 7 shows a sectional view through the locking device and FIG. 8 shows a perspective view of the electromechanical actuator assembly, the extension element and the anti-pull-out device.

FIG. 7 shows a sectional view through the locking device 1, wherein the stator 10 is shown with the stator body 11, and in the stator body 11 the first rotor element 32 and the second rotor element 33 are shown. The first rotor element 32 has the keyway 36 into which the key 200 shown in FIG. 1 can be inserted. The second rotor element 33 merges into the connecting portion 38, which has already been described in connection with FIG. 2. The sectional view is selected such that the extension element 40 is shown within the stator body 11 and at the same time the second rotor element 33 is shown in cross-section. The extension element 40 extends off-centre through the stator body 11 so that the extension element 40 is at a radial distance from the central rotor axis 35.

The extension element 40 is forced into the withdrawal position by a force store 49, such that the force is applied by the force store 49 against the insertion movement of the key 200.

The extension element 40 has an elastic engagement element 74. The engagement element 74 is intended for engagement with the key 200. Due to the engagement of the engagement element 74 in the key 200, the extension element 40 can also be moved again when the key is withdrawn from the insertion position into the withdrawal position, in particular if the energy store has been manipulated and therefore the extension element 40 no longer pushes into the withdrawal position.

The engagement of the engagement element 74 takes place in that the engagement element 74 in the insertion position rests against the inner side 75 of the stator body 11 against the elastic effect of the engagement element 74 and is forced to engage the key 200. In the withdrawal position, however, the engagement element 74 is located in a hollow space 76 inside the first rotor element 32. This makes it possible for the engagement element 74 to slide out of the key 200 due to the elastic force and/or due to a chamfer 202. The hollow space 76 merges into the keyway 36.

FIG. 8 illustrates the extension member 40 in a perspective view adjacent to the electromagnetic actuator assembly 50. The extension element 40 is pretensioned by the energy store 49 against the direction of movement 71, wherein the pretensioning direction corresponds to the direction in which the extension element 40 is held in the withdrawal position for the key 200. In this position, the engagement element 74 can engage the key 200 when the key 200 is inserted by an operator or release the key 200 when it is withdrawn. During a subsequent insertion movement from the withdrawal position into the insertion position, the energy store 49 is compressed.

The portion 86 of the extension element 40 is offset with respect to the base body of the extension element 40, wherein the spring 49 is inserted into the base portion of the extension element 40 adjacent to the portion 86. The front side of the portion 86 initiates a thrust movement into the coupling part 41, as shown in FIG. 2. The stop 83 is located on the underside of the portion 86.

The spring device 88 prevents the energy store 49 from pressing the extension element 40 into the withdrawal position without the help of a user when the key 200 is inserted. Thus, the spring device 88 indirectly prevents the spring element 80 from rotating the blocking element 51 into a blocking position without the intent of a user. This prevents premature locking of the locking device 1. The spring device 88 is designed to be stronger than the energy store 49. Thus, a user must actively pull on the key to force the anti-pull-out device 22 into the first position and to withdraw the key 200, as a result of which the extension element 40 is moved into the withdrawal position and the blocking element 51 is moved into the starting position by the spring element 80. This prevents the locking element 31 from prematurely reaching the first position. Thus, the locking device remains in a release state without a user pulling on the key 200.

The installation device 1 can also be used in other closing devices, for example in a half cylinder, a knob cylinder, a furniture cylinder or a padlock.

It is conceivable that the coupling part 41 is missing. Rather, closing devices according to the disclosure can be provided in which the driver 103 is rigidly attached to the rotor 30. The driver 103 can also serve as a bolt itself, e.g. in a furniture lock.

The driver 103 and the insert 105 can be formed integrally with each other.

The stator insert element 13 and the stator body 11 can be formed as one piece. It is also conceivable that the casing 14 is missing and the stator body is fastened directly in the closing device housing 101.

In a further alternative of the disclosure, the locking device 1 is not designed as an installation device 1. Rather, the stator 10 is designed as a closing device housing 101. Thus, the rotor 30 can be designed to be inserted directly into a closing cylinder housing 101. The closing device housing 101 then takes over the function of the stator 10.

The transmission device can transmit energy and/or data contactlessly.

The stator insert element 13 can be formed integrally with the stator body 11. The rotor 30 does not have to have a plurality of rotor elements 32, 33. Nevertheless, the rotor can have 30 portions with different diameters.

The protective element parts 87, 90 can be connected to each other in a hinge-like manner. Instead of the protective element parts, the annular bent region can comprise a first and a second partial region, which are integrally connected to one another by a flexible, hinge-like portion. Furthermore, the first and the second partial region can be designed corresponding to the protective element parts 87,90. Instead of the spring device 88, the protective element parts 87, 90 can be integrally connected to one another in an elastic manner.

The design of the disclosure is not restricted to the preferred exemplary embodiment indicated above. In fact, a number of variants is conceivable, which make use of the represented solution even in the case of fundamentally different designs. All features and/or advantages emerging from the claims, the description or the drawings, including constructive details or spatial arrangements, may be essential to the disclosure even in the most varied combinations.

The invention claimed is:

1. A locking device comprising: a stator, a rotor, and an anti-pull-out device mounted in the stator and configured for preventing a key from being pulled out over a rotational angle range, wherein the anti-pull-out device is moved into a first position and into a second position, wherein the anti-pull-out device has an elastic design, wherein the elastic effect forces the anti-pull-out device into the second position, wherein the anti-pull-out device has a bent annular region for operatively connecting to the key, wherein the bent annular region comprises at least one gap in the first position for introducing a key, wherein in the second position of the anti-pull-out device, the gap is modified such that the key is prevented from being inserted or from being pulled out wherein when the key is rotated with the rotor of the locking device, the key assumes different rotational positions with respect to the stator and thus with respect to the anti-pull-out device, wherein in at least one rotational position, which corresponds to at least one start position, the key can be withdrawn, wherein in other rotational positions, which are designed as locking positions, the key is prevented from being withdrawn by the anti-pull-out device.

2. The locking device according to claim 1, wherein the gap in the second position is formed with a smaller width than in the first position, wherein in the second position the width of the gap is reduced such that the width of the gap is smaller than the width of the key and/or wherein in the first position the width of the gap is formed greater than or equal to the width of the key.

3. The locking device according to claim 1, wherein the anti-pull-out device is formed with a first end and with a second end, wherein the first end and the second end are moved against each other from a transition from the first position to the second position such that the width of the gap is smaller in the second position than in the first position.

4. The locking device according to claim 1, wherein the annular bent region comprises at least a first partial region, and a second partial region, wherein the first partial region and the second partial region are forced towards one another by the elastic effect.

5. The locking device according to claim 4, in that the annular bent region comprises at least one stop with which a position of the annular bent region in the second position is defined against the elastic effect, wherein at least a first and a second stop are provided, wherein the elastic effect forces the first partial region in a first direction and the second partial region in a second, opposite direction, wherein the first stop limits the movement of the first partial region in the first direction and the second stop limits the movement of the second partial region in the second direction.

6. The locking device according to claim 1, wherein the anti-pull-out device comprises a spring device, wherein the spring device forces the anti-pull-out device into the second position.

7. The locking device according to claim 1, wherein the anti-pull-out device comprises a first sliding surface in order to be moved into the first position against the elastic force, against the force of the spring device, when the key is inserted and/or wherein the anti-pull-out device comprises a second sliding surface in order to be moved into the first position against the elastic force, by the force of the spring device, when the key is withdrawn.

8. The locking device according to claim 1, wherein the spring device is designed as a leaf spring adapted to the contour of the anti-pull-out device.

9. The locking device according to claim 1, wherein the anti-pull-out device is inserted in a groove of the rotor, a first rotor element of the rotor.

10. The locking device according to claim 1, wherein during a rotation of the key the anti-pull-out device is fixed in the stator in a rotationally fixed manner in the first position and in the second position.

11. The locking device according to claim 1, wherein the locking device comprises a latching device to inhibit a movement of the rotor towards the stator, wherein the latching device springs back parallel to a rotor axis of the locking device during a latching process.

12. The locking device according to claim 1, wherein the locking device comprises an extension element, wherein the extension element assumes an insertion position when the key is inserted and a withdrawal position when the key is withdrawn, wherein a mechanical force store is provided that forces the extension element into the withdrawal position, wherein in the case of an inserted key the anti-pull-out device, in the second position against the force of the force store, prevents movement of the extension element from the insertion position into the withdrawal position.

13. The locking device according to claim 1, wherein the locking device comprises a blocking element, wherein a starting position and a release position can be assumed by the blocking element, wherein when the extension element is in the insertion position and the blocking element is in the release position, the extension element blocks a movement of the blocking element into the starting position, wherein a spring element is provided that forces the blocking element in the release position against the extension element.

14. A closing device with a locking device according to claim 1, wherein the closing device comprises a closing device housing, wherein the locking device is accommodated in the closing device housing.

15. A closing system with a locking device according to claim 1 or with a closing device comprising a closing device housing, wherein the locking device is accommodated in the closing device housing and with a key.

* * * * *